(12) United States Patent
Matsumura et al.

(10) Patent No.: US 11,601,903 B2
(45) Date of Patent: Mar. 7, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Masaya Okamura, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 12 days.

(21) Appl. No.: 17/267,241

(22) PCT Filed: Aug. 10, 2018

(86) PCT No.: PCT/JP2018/030151
§ 371 (c)(1),
(2) Date: Feb. 9, 2021

(87) PCT Pub. No.: WO2020/031388
PCT Pub. Date: Feb. 13, 2020

(65) Prior Publication Data
US 2021/0168744 A1 Jun. 3, 2021

(51) Int. Cl.
*H04W 56/00* (2009.01)
*H04B 7/06* (2006.01)
*H04L 5/00* (2006.01)
*H04L 27/26* (2006.01)
*H04W 16/28* (2009.01)

(52) U.S. Cl.
CPC ........ *H04W 56/001* (2013.01); *H04B 7/0626* (2013.01); *H04L 5/0048* (2013.01); *H04L 27/26025* (2021.01); *H04W 16/28* (2013.01)

(58) Field of Classification Search
CPC ........... H04W 56/001; H04W 56/0015; H04W 16/28; H04B 7/0626; H04B 7/0628; H04L 27/26025; H04L 27/261; H04L 27/2675; H04L 5/0048; H04L 5/0023
USPC .................................................. 370/329–330
See application file for complete search history.

(56) References Cited

U.S. PATENT DOCUMENTS

| 2019/0174466 A1* | 6/2019 | Zhang | H04L 5/0057 |
| 2019/0342907 A1* | 11/2019 | Huang | H04L 5/0048 |
| 2020/0045569 A1* | 2/2020 | Seo | H04W 72/10 |

OTHER PUBLICATIONS

International Search Report issued in PCT/JP2018/030151 dated Oct. 23, 2018 (1 page).

(Continued)

*Primary Examiner* — Candal Elpenord
(74) *Attorney, Agent, or Firm* — Osha Bergman Watanabe & Burton LLP

(57) ABSTRACT

In order to appropriately control receiving operation in a UE even when a synchronization signal block and a given reference signal overlap with each other in a time resource, a user terminal according to an aspect of the present disclosure includes: a receiving section that receives a synchronization signal block and a given reference signal; and a control section that, when the synchronization signal block and the given reference signal are configured in the same time resource, controls reception of the synchronization signal block and the given reference signal based on a quasi-colocation (QCL) relationship and a subcarrier spacing of the synchronization signal block and the given reference signal.

9 Claims, 11 Drawing Sheets

(56) References Cited

OTHER PUBLICATIONS

Written Opinion of the International Searching Authority issued in PCT/JP2018/030151 dated Oct. 23, 2018 (4 pages).
Intel Corporation; "Summary of Discussion for NR RRM measurements"; 3GPP TSG RAN WG1 Meeting #93, R1-1807628; Busan, South Korea; May 21-25, 2018 (10 pages).
Intel Corporation; "Remaining details of RRM measurements"; 3GPP TSG RAN WG1 Meeting #92bis, R1-1804708; Sanya, China; Apr. 16-20, 2018 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #92bis; R1-1805704 "Feature lead summary 2 of remaining issues for RS multiplexing" Huawei, HiSilicon; Sanya, China; Apr. 16-20, 2018 (17 pages).
3GPP TSG RAN WG1 Meeting AH 1801; R1-1800862 "Text proposals on CSI-RS" Qualcomm Incorporated; Vancouver, Canada; Jan. 22-26, 2018 (9 pages).
Extended European Search Report issued in European Application No. 18929664.3, dated Feb. 18, 2022 (10 pages).
Office Action issued in the counterpart ARIPO Patent Application No. AP/P/2021/013012, dated Jul. 22, 2022 (5 pages).
AT&T; "Details of SS Block and CSI-RS Measurement Configurations"; 3GPP TSG-RAN WG2 #99bis, R2-1711674; Prague, Czech Republic; Oct. 9-13, 2017 (5 pages).

\* cited by examiner

☒ SSB    ☒ CSI-RS    ░ MEASUREMENT WINDOW

SSB    CSI-RS    MEASUREMENT WINDOW

CSI-RS OF WHICH RECEPTION IS NOT NECESSARY

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and the like (see Non-Patent Literature 1). In addition, the specifications of LTE-A (LTE Advanced, LTE Rel. 10, 11, 12, and 13) have been drafted for the purpose of further increasing the capacity and enhancement of LTE (LTE Rel. 8 and 9).

Successor systems of LTE (for example, FRA (Future Radio Access), 5G (5th generation mobile communication system), 5G+(plus), NR (New Radio), NX (New radio access), FX (Future generation radio access), LTE Rel. 14 or 15 or later versions) are also under study.

In an existing LTE system (for example, LTE Rel. 8-14), a user terminal (user equipment (UE)) measures a channel state using a given reference signal (or a resource for the reference signal). The reference signal used for channel state measurement can be referred to as a channel state information-reference signal (CSI-RS).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (hereinafter, also simply referred to as NR), measurement using a synchronization signal block (SSB) is also used in addition to measurement using CSI-RS. The UE is notified of SSB-based measurement timing configuration (SMTC) related to measurement using SSB. The UE performs measurement based on the SSB to be measured (which may be referred to as SSB measurement) in a configured SMTC window.

For example, it is conceivable that, in NR, measurement using SSB (for example, transmission timing of SSB) and measurement using a channel state information-reference signal (CSI-RS) (transmission timing of CSI-RS) are set to the same time resource. However, receiving operation of the UE when SSB and CSI-RS are transmitted with the same time resource has not been sufficiently examined. There is a problem that, if receiving SSB and CSI-RS cannot be controlled appropriately, communication quality deteriorates.

Therefore, an object of the present disclosure is to provide a user terminal and a radio communication method capable of appropriately controlling receiving operation in a UE even when a synchronization signal block and a given reference signal overlap with each other in terms of time resources.

Solution to Problem

A user terminal according to an aspect of the present disclosure includes: a receiving section that receives a synchronization signal block and a given reference signal; and a control section that, when the synchronization signal block and the given reference signal are configured in the same time resource, controls reception of the synchronization signal block and the given reference signal based on a quasi-colocation (QCL) relationship of the synchronization signal block and the given reference signal and a subcarrier spacing.

Advantageous Effects of Invention

According to an aspect of the present disclosure, even when a synchronization signal block and a given reference signal overlap with each other in terms of time resources, receiving operation in a UE can be appropriately controlled.

DESCRIPTION OF EMBODIMENTS

Figure 1:
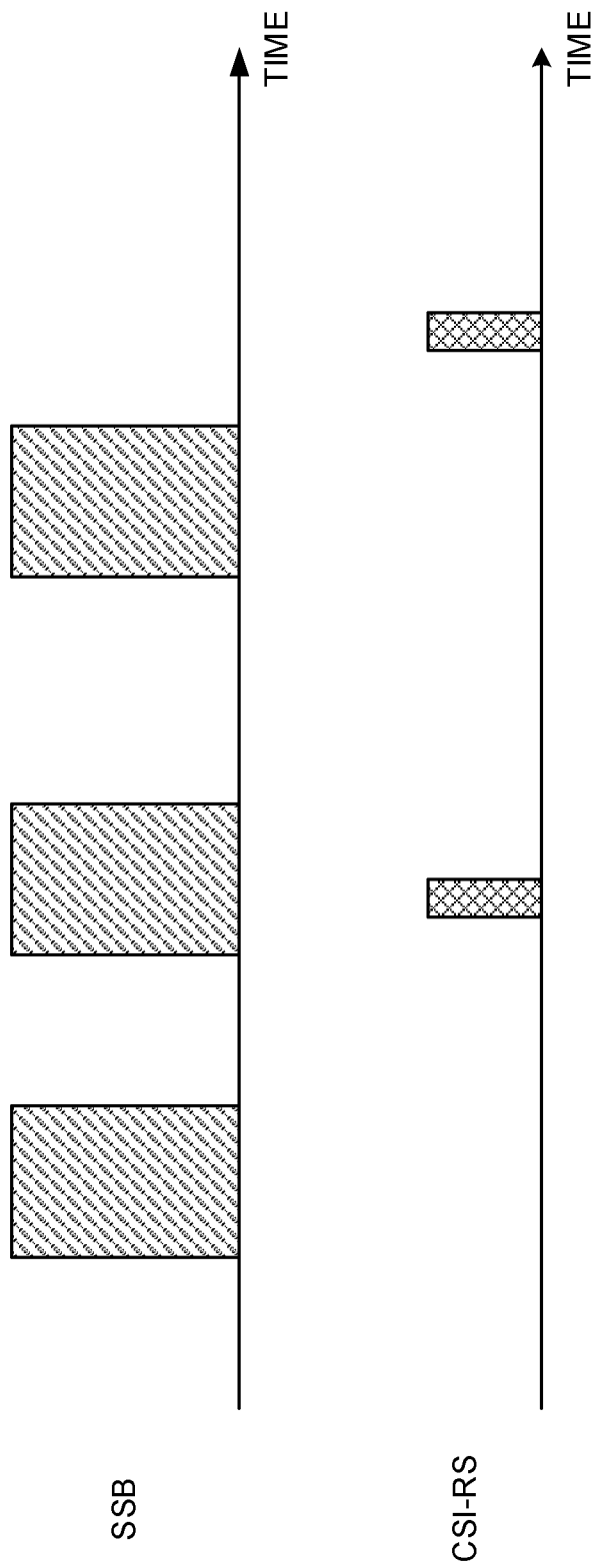
FIG. 1 is a diagram for explaining simultaneous receiving of SSB and CSI-RS in NR.

In future radio communication systems (hereinafter, NR), it is examined to perform communication using beam forming (BF). Therefore, it has been considered that the UE controls reception processing of a channel (for example, at least one of receiving, demapping, demodulation, and decoding) on the basis of the state (TCI state) of the transmission configuration indication or transmission configuration indicator (TCI)) of the channel.

(TCI State)

In NR, it has been considered that the UE controls reception processing of a channel (for example, at least one of receiving, demapping, demodulation, and decoding) on the basis of the state (TCI state) of the transmission configuration indication or transmission configuration indicator (TCI)) of the channel.

Here, the TCI state is information related to quasi-co-location (QCL)) of a channel or signal, and is also referred to as spatial reception parameter, spatial information (spatial info), or the like. The TCI state is specified in the UE for each channel or signal. The UE may determine at least one of a transmission beam (Tx beam) and a reception beam (Rx beam) of each channel on the basis of the TCI state specified for each channel.

Here, the QCL is an index showing the statistical properties of at least one of a channel and a signal (channel/signal). For example, when a plurality of channels/signals have a QCL relationship, this may mean that it is possible to assume that the plurality of different channels/signals have at least one identical property (QCL is established regarding at least one of these) out of: Doppler shift, a Doppler spread, an average delay, and a delay spread, a spatial parameter (for example, a spatial reception parameter (referred to as Spatial Rx Parameter)).

The spatial reception parameter (spatial QCL) may correspond to the Rx beam of the user terminal (for example, reception analog beam), and the Rx beam may be specified on the basis of the spatial QCL.

A plurality of types of QCL (QCL type) may be defined. In one example, four QCL types A to D of different parameters (or parameter sets) that are assumable to be identical can be provided, which parameters are shown below:

QCL type A: Doppler shift, Doppler spread, average delay, and delay spread
QCL type B: Doppler shift and Doppler spread
QCL type C: Doppler shift and average delay
QCL type D: spatial reception parameter The information related to QCL as described above (QCL information, QCL-Info) may be specified for each channel. The QCL information for each channel may include (or may indicate) at least one of the following information:

Information indicating the above QCL type (QCL type information),
Information (RS information) related to a reference signal (RS) that has a QCL relationship with each channel,
Information indicating a carrier (cell) in which the RS is located,
Information indicating a bandwidth part (BWP) where the RS is located, and
Information indicating the spatial reception parameters (for example, Rx beam) of each channel.

For example, if there is a given quasi-co-location relation (for example, QCL type D) between different signals, it is conceivable to use the same beam for reception.

In NR, in addition to the measurement using the channel state information reference signal (CSI-RS), the measurement using the synchronization signal block (SSB) is also used. The SSB is a signal block including at least one of a primary synchronization signal (PSS), a secondary synchronization signal (SSS), and a physical broadcast channel (PBCH).

The UE performs measurement based on the SSB to be measured (which may be referred to as SSB measurement) in the SMTC window on the basis of the SSB-based measurement timing configuration (SMTC) related to the measurement using the SSB.

For example, it is conceivable that, in NR, measurement using SSB (for example, transmission timing of SSB) and measurement using a CSI-RS (transmission timing of CSI-RS) are set to the same time resource. However, receiving operation of the UE when SSB and CSI-RS are transmitted with the same time resource has not been sufficiently examined. There is a problem that, if receiving SSB and CSI-RS cannot be controlled appropriately, communication quality deteriorates.

In order to solve the above problems, for example, operation of the UE when the UE receives SSB and CSI-RS at the same time has been examined. When the UE receives SSB and CSI-RS at the same time, there are problems as below. Here, "the UE receives SSB and CSI-RS at the same time" means that the UE receives SSB and CSI-RS at least partially overlapping in the time resource (for example, a symbol).

(1) When an analog beam is used to transmit a signal (particularly, a second frequency range (FR2), if a beam other than QCL type D is configured for SSB and CSI-RS with the same symbol (TCI state), and the UE can form only one reception beam, the UE cannot receive the SSB and the CSI-RS at the same time.

(2) SSB and CSI-RS may have different SCS (subcarrier spacing, numerology). This is because it is necessary to use an advanced receiver in order to receive two reference signals with different SCSs at the same time, and it is considered that whether or not they can be received at the same time depends on the performance of the UE.

Therefore, the present inventors have paid attention to the quasi-collocation relationship between SSB and CSI-RS and the subcarrier spacing, examined a method of appropriately controlling the receiving processing when SSB and CSI-RS are configured in the same time resource, and achieved the present invention.

Now, the present embodiment will be described below in detail with reference to the drawings. The embodiments below may be applied independently or in combination. In the following description, the receiving operation of SSB and CSI-RS configured in the same time resource will be described, but the signal to which the present embodiment is applicable is not limited to this. The present embodiment may be applied to other reference signals.

A mode of the present invention is a user terminal that receives a synchronization signal block and a given reference signal, and, when the synchronization signal block and the given reference signal are configured in the same time resource, controls reception of the synchronization signal block and the given reference signal based on a quasi-colocation (QCL) relationship and a subcarrier spacing of the synchronization signal block and the given reference signal. Hereinafter, this user terminal will be described.

(First Mode)

In the present mode, as shown in FIG. 1, a UE in which SSB and CSI-RS are configured in the same symbol operates as below. In this case, the UE operation may be different between when the TCI states of the SSB and the CSI-RS are the same (QCL type D) and/or when the analog beam is not applied (first frequency range (FR1) or the like), and when the TCI states of the SSB and the CSI-RS are different (not QCL type D).

<When TCI States of SSB and CSI-RS are the Same>

When the TCI states of the SSB and the CSI-RS are the same, the UE operation is further different between when the SCSs of the SSB and the CSI-RS are the same and when the SCSs of the SSB and the CSI-RS are different. "When the TCI states of the SSB and the CSI-RS are the same" may be read as when the SSB and the CSI-RS have a given quasi-collocation relationship (are QCL type D).

If the SCSs of the SSB and the CSI-RS are the same, the UE receives the SSB and the CSI-RS at the same time. As a result, communication can be controlled using both the SSB and the CSI-RS without increasing the receiving load of the UE receiving processing. As a result, it is possible to improve the communication throughput or the communication quality.

On the other hand, when the SCSs of the SSB and the CSI-RS are different, the UE operation may be configured differently as below depending on the presence or absence of capability (or presence or absence of reporting) of the simultaneous receiving of the SSB and the CSI-RS.

1) If the UE has reported that the UE supports simultaneous receiving capability, the UE receives the SSB and the CSI-RS at the same time. This makes it possible to flexibly control the simultaneous receiving of the SSB and the CSI-RS having different SCSs according to the capabilities of the UE, for each UE.

2) If the UE has reported that the UE does not support simultaneous receiving capability, the UE does not receive the SSB and the CSI-RS at the same time. As a result, it is possible to suppress an increase in the load of receiving processing of the UE.

3) If the UE does not report the capability of simultaneous reception, the UE does not receive the SSB and the CSI-RS at the same time. As a result, it is possible to suppress an increase in the load of receiving processing of the UE.

If the UE does not receive the SSB and the CSI-RS at the same time, the UE performs either operation of receiving only SSB, receiving only CSI-RS, or receiving neither (or may not receive) SSB nor CSI-RS.

<When TCI States of SSB and CSI-RS are Different>

When the TCI states of the SSB and the CSI-RS are different, the UE operation may be further different between when the SCSs of the SSB and the CSI-RS are the same and when the SCSs of the SSB and the CSI-RS are different.

If the SCSs of the SSB and the CSI-RS are the same, the UE does not receive the SSB and the CSI-RS at the same time. By such configuration, it is possible to suppress a receiving error in the UE that does not support receiving of a plurality of beams. For UE that has reported the UE capability of the multi-beam in the second mode described later may be configured to receive the SSB and the CSI-RS at the same time.

On the other hand, as shown in FIG. 1, when the SCSs of the SSB and the CSI-RS configured to overlap in a time resource are different, the UE does not receive the SSB and CSI-RS at the same time. As a result, it is possible to suppress an increase in the load of receiving processing of the UE. However, the UE that has reported the simultaneous receiving capability of different SCSs described above may be configured to receive the SSB and the CSI-RS at the same time.

When the UE does not receive the SSB and the CSI-RS at the same time, the UE may receive only the SSB when many operations using SSB are configured. The UE may receive only CSI-RS when many operations using CSI-RS are configured. The UE may not receive either SSB and CSI-RS when they are configured to overlap in the same time resource. This makes it possible to reduce the load of receiving processing (selection of a received signal or the like) of the UE.

<Time Resource where SSB and CSI-RS are Configured>

Figure 2A:
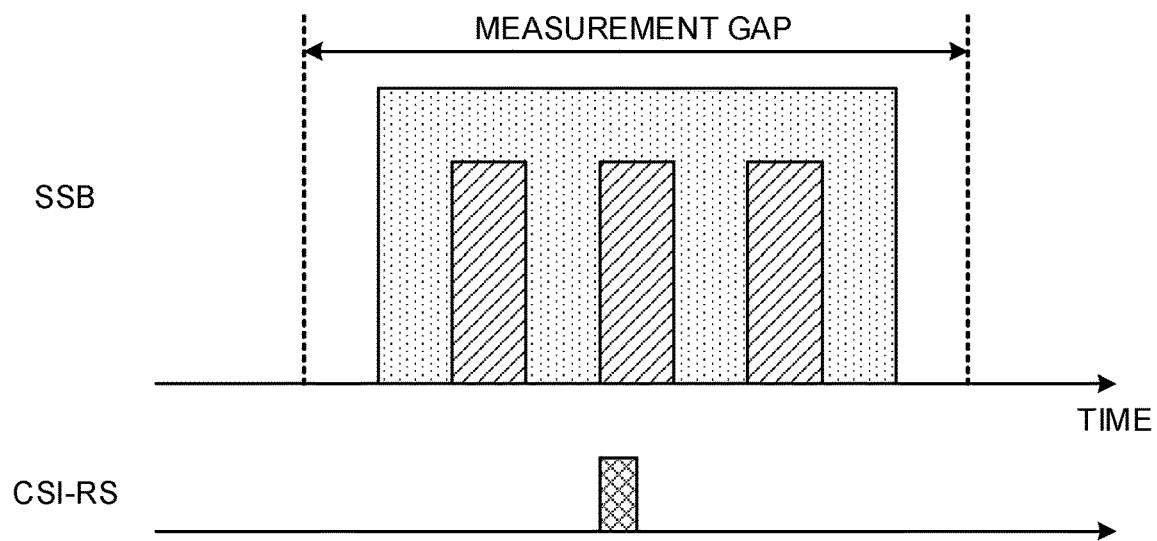
FIGS. 2A and 2B are diagrams showing an example of simultaneous receiving of SSB and CSI-RS in a first mode.
Figure 2B:
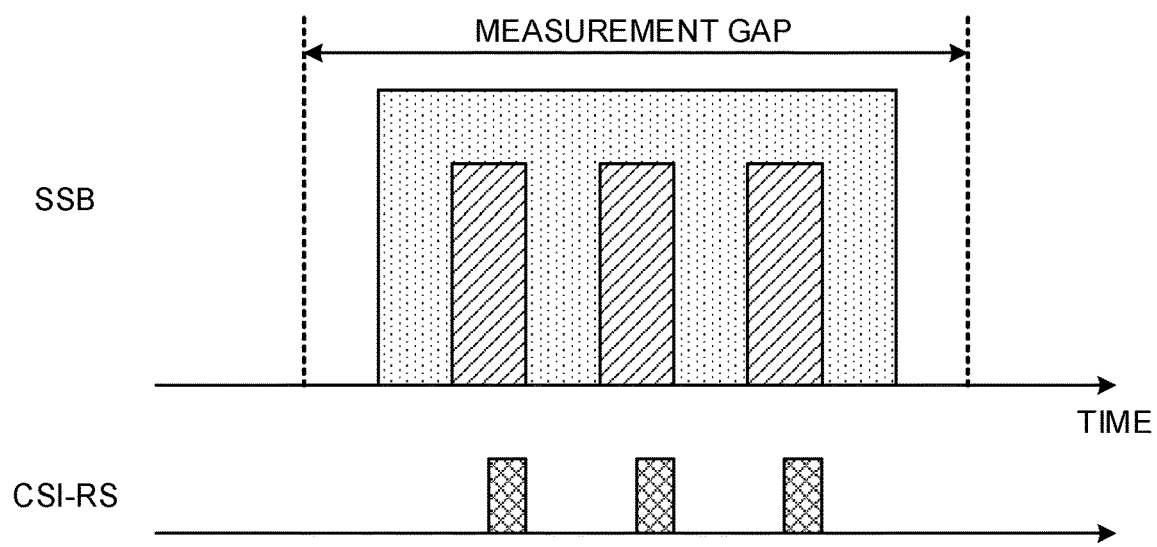

The time resource in which SSB and CSI-RS are configured may be any of the below. That is, as shown in FIGS. 2A and 2B, at least one symbol of CSI-RS may be configured to overlap in the same symbol as SSB.

Alternatively, at least one symbol of CSI-RS may be configured to be included in the SSB measurement window (SMTC window). Alternatively, at least one symbol of CSI-RS may be configured to be included in the SSB measurement gap. In any case, given symbols (for example, one symbol) before and after the target symbol, for example, several symbols for beam switching, may be included.

Next, the cases below are assumed as conditions for applying the "receive or not receive SSB and CSI-RS at the same time" rule.

Figure 3A:
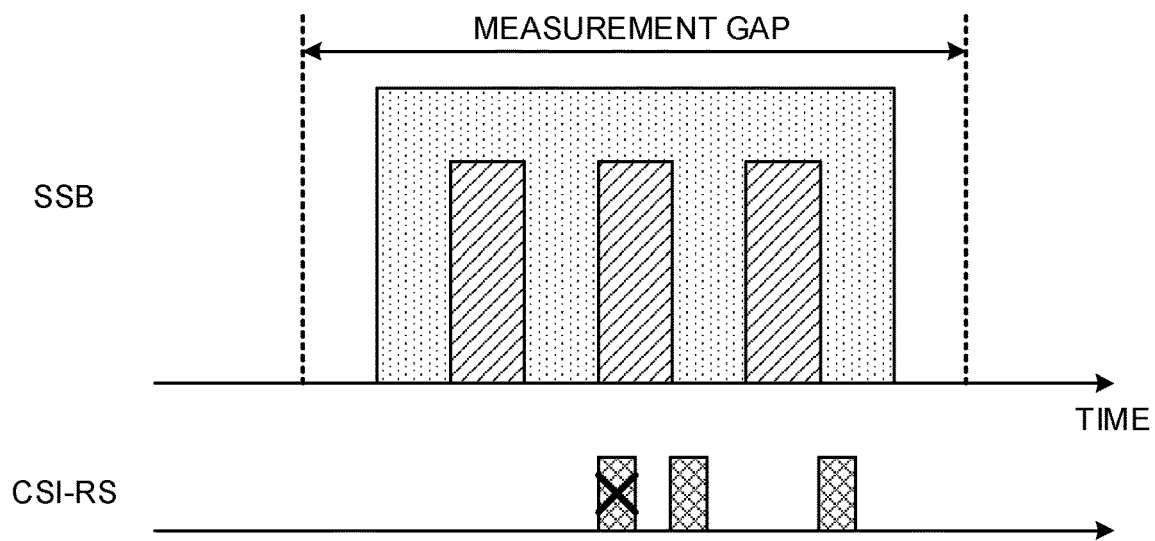
FIGS. 3A and 3B are diagrams showing another example of simultaneous receiving of SSB and CSI-RS in a first mode.

(1) As shown in FIG. 3A, the above rule (receive or not receive SSB and CSI-RS at the same time) may be applied only when the CSI-RS and the SSB are in the measurement window, are within the measurement gap, and have the same symbol. By such configuration, the UE can measure as many CSI-RS and SS as possible, so that the measurement accuracy of beam measurement and channel state information can be improved. This enables highly accurate beam switching and high-quality communication using highly accurate channel information.

FIG. 3A shows a case where, when the CSI-RS and the SSB are in the measurement window, are within the measurement gap, and have the same symbol, the UE does not receive the CSI-RS and the SSB at the same time (the CSI-RS has been configured but does not have to be received), and receives the CSI-RS having a symbol different from the SSB.

Figure 3B:
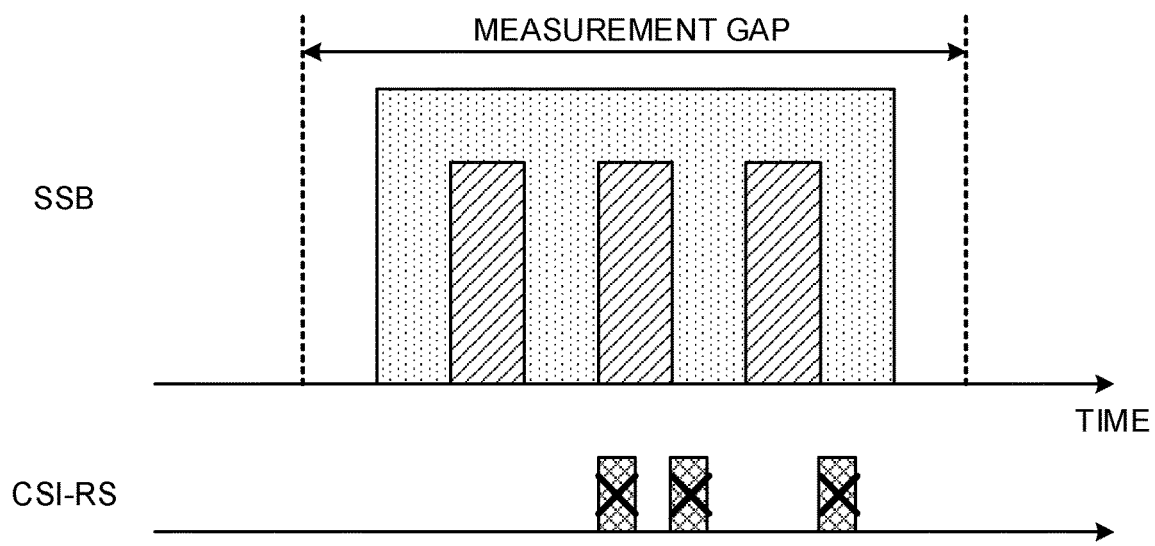

(2) As shown in FIG. 3B, when the CSI-RS and the SSB are in the measurement window and at least CSI-RS and SSB of one symbol (a part) have the same symbol, the above rule (receive or not receive SSB and CSI-RS) is applied. With such configuration, the UE does not have to switch beams frequently to measure both the CSI-RS and the SS, which simplifies the operation of the UE and reduces the power consumption due to beam switching.

FIG. 3B shows a case where, when the CSI-RS and the SSB are in the measurement window and are within the measurement gap, and at least the CSI-RS and the SSB of at least one symbol have the same symbol, the UE does not receive the CSI-RS and the SSB at the same time (the CSI-RS has been configured but does not have to be received), and also does not receive the CSI-RS having a symbol different from the SSB. This operation is operation in which the UE operation is omitted in consideration of the occurrence of beam switching.

Figure 4A:
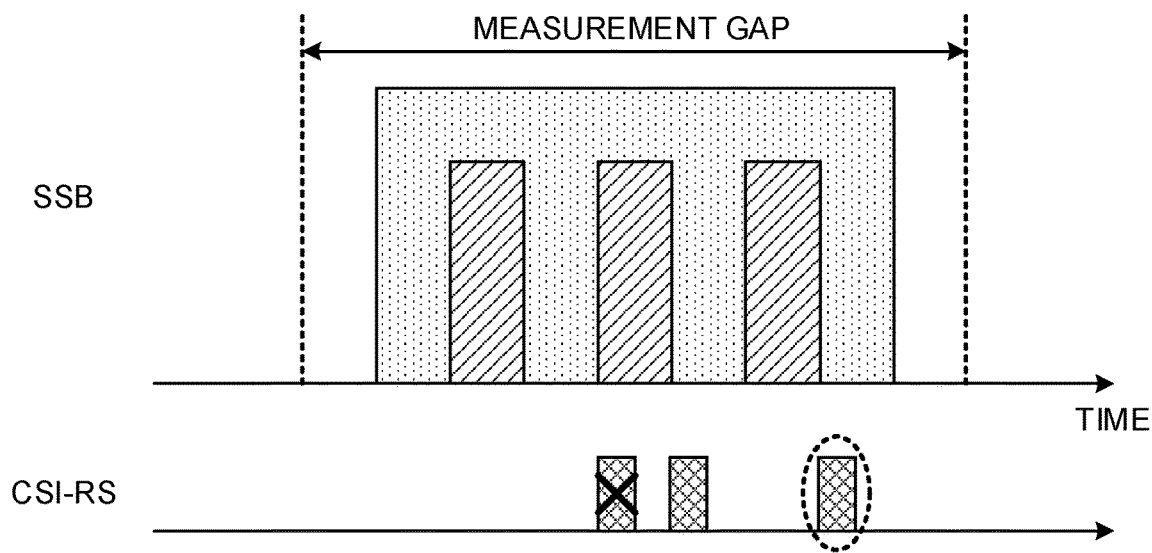
FIGS. 4A and 4B are diagrams showing another example of simultaneous receiving of SSB and CSI-RS in the first mode.
Figure 4B:
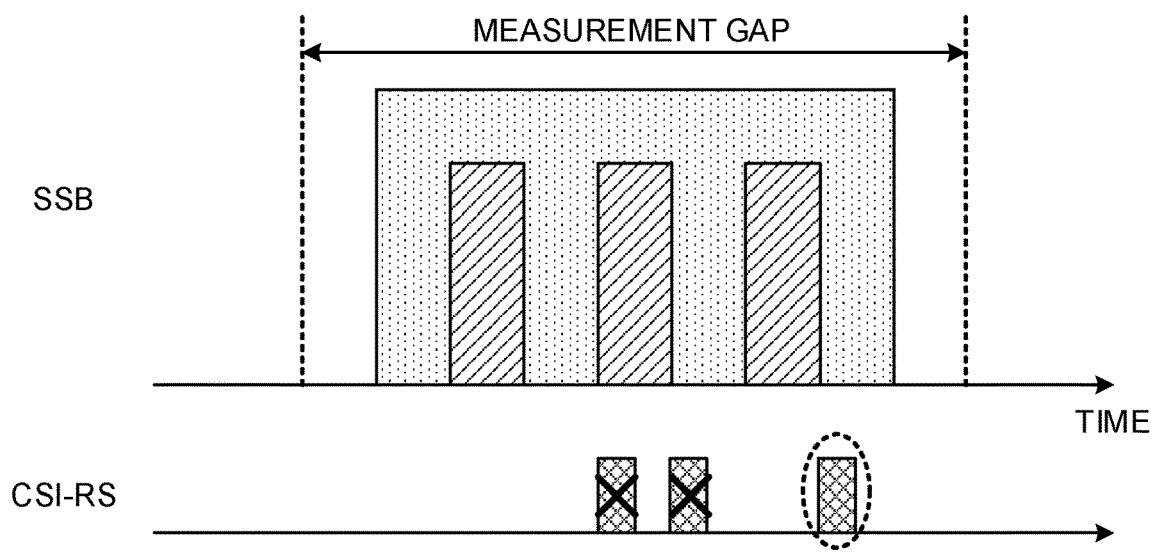

In the present mode, the UE may receive the CSI-RS configured outside the measurement window of the SSB or outside the measurement gap. For example, as shown in FIG. 4A, the CSI-RS outside the SSB measurement window may be received when the SSB and the CSI-RS are not received at the same time only if they have the same symbol. As shown in FIG. 4B, the CSI-RS outside the measurement window of SSB may be received when the simultaneous reception is not performed if at least part of CSI-RS and SSB have the same symbol. This makes it possible to appropriately receive the CSI-RS outside the measurement window of the SSB (for example, the CSI-RS that is unlikely to collide with the SSB).

(Second Mode)

In the present mode, configuration may be performed such that the UE reports whether the UE can receive a plurality of beams at the same time to the network by UE capability, and the UE that has reported that the UE can receive a plurality of beams at the same time receive the SSB and the CSI-RS regardless of whether it is QCL type D or not.

By such configuration, a UE having a predetermined UE capability can receive the SSB and the CSI-RS at the same time. The UE that does not report this capability may be configured to operate in the same manner as the UE that has reported that the UE cannot receive a plurality of beams at the same time. Whether or not the UE can receive a plurality of beams at the same time may be reported in 1 bit by the UE capability, and if the UE can receive a plurality of beams at the same time, the report may include how many beams can be supported.

Figure 5A:
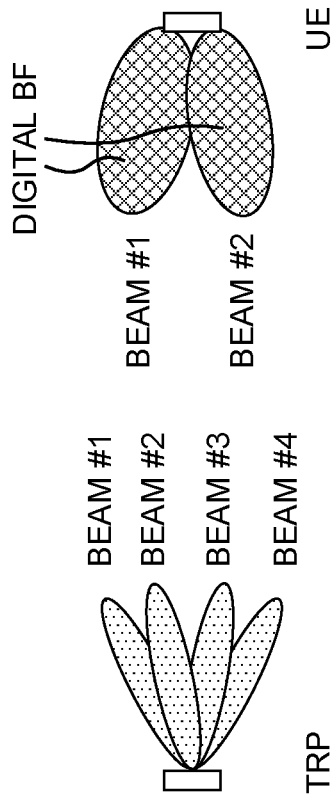
FIGS. 5A and 5B are diagrams showing another example of simultaneous receiving of SSB and CSI-RS in a second mode.
Figure 5B:
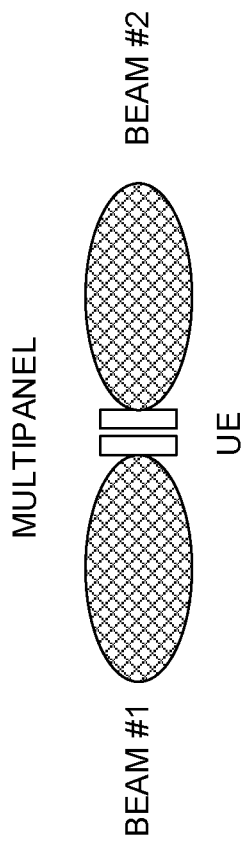

In the present mode, the assumed scenario is a case where the UE supports a digital beam, as shown in FIG. 5A. Here, the digital beam is a method of performing precoding signal processing (for a digital signal) on the base band. In this case, parallel processing of Inverse Fast Fourier Transform (IFFT)/Digital to Analog Converter (DAC)/Radio Frequency (RF) is required for the number of antenna ports (RF chains). On the other hand, as many beams as the number of RF chains can be formed at any timing. Also, in the present mode, the assumed scenario is a case where the UE supports multi-panels, as shown in FIG. 5B.

(Third Mode)

In the present mode, it will be described which signal is selected and received when the UE cannot receive the SSB and the CSI-RS overlapping in the same time resource at the same time.

(1) Configuration may be performed such that the priority changes depending on the kind of signal the SSB and the CSI-RS are used for (usage). By such configuration, it is possible to give priority to operation that is more important for communication, so that deterioration of communication quality can be suppressed. Examples of application include Radio Resource Management (RRM) (L3 measurement), Radio Link Monitoring (RLM), Beam Failure Detection (BFD), Beam Management (BM) (L1 Reference Signal Received Power (RSRP) measurement, L1 Reference Signal Received Quality (RSRQ) measurement, Signal to Interference plus Noise Ratio (SINR)), and CSI measurement.

For example, configuration may be performed such that a lower priority is given to the reference signal for RRM than CSI-RS even if it is SSB, and the reference signal for BM and the reference signal for RLM are preferentially received. By such configuration, beam management can be made appropriately in radio communication, so that it can be suitably applied to a communication system using a beam.

(2) The priority may be determined according to the use of the reference signal instead of SSB or CSI-RS. For example, configuration may be performed such that the UE receives a reference signal for the use of high priority and does not receive other reference signals in the symbols that are the same as the symbol of the reference signal and the symbols before and after the symbol of the reference signal. By such configuration, it is possible to give priority to operation that is more important for communication, so that deterioration of communication quality can be suppressed.

From descending order of priority, for example
BM (L1 RSRP measurement)>BFD>RLM,
CSI measurement=RRM (L3 measurement)
may be configured, and
BM (L1 RSRP measurement)>BFD>RLM,
CSI measurement>RRM (L3 measurement)
may be configured.

This is because while BM is necessary to prevent beam failure and redio link failure, it can be assumed that the characteristics will not deteriorate immediately even if CSI measurement=RRM is not received. However, in the case of the same priority, configuration may be performed such that SSB>CSI-RS or CSI-RS>SSB.

In the present mode, configuration may be performed such that, even when SSB and CSI-RS are in separate component carriers (CCs) that are in carrier aggregation (CA) and are not QCL type D, the priority is determined according to the type or usage of the signal or the type of the cell, and either one is received. By such configuration, the UE can preferentially receive the reference signal in the cell having a high priority in communication, so that it is possible to suppress deterioration of the quality of more important communication.

The priority determination method may be performed in consideration of SSB and CSI-RS (for example, SSB>CSI-RS), the above-mentioned reference signal use, cell type (for example, Pcell>PSCell>SCell), cell index (for example, the lowest CC index is prioritized or the largest CC index is prioritized), the frequency band of the cell (for example, FR1>FR2, FR2>FR1) and the like.

For example, FR1 may be a frequency band of 6 GHz or less (sub-6 GHz), and FR2 may be a frequency band higher than 24 GHz (above-24 GHz). FR1 may be defined as a frequency range in which at least one of 15, 30, and 60 kHz is used as a Sub-Carrier Spacing (SCS), and FR2 may be defined as a frequency range in which at least one of 60 and 120 kHz is used as the SCS. Moreover, the frequency bands, definitions, and the like of FR1 and FR2 are not limited to these, and for example, FR1 may be a frequency band higher than FR2. The FR2 can be used only for the time division duplex (TDD) band. FR2 is preferably operated synchronously among a plurality of base stations. When FR2 includes a plurality of carriers, it is preferable that these carriers are operated synchronously.

(Radio Communication System)

Now, the structure of a radio communication system according to the present embodiment will be described below. In this radio communication system, communication is performed using one or a combination of the radio communication methods according to the embodiments of the present disclosure.

Figure 6:
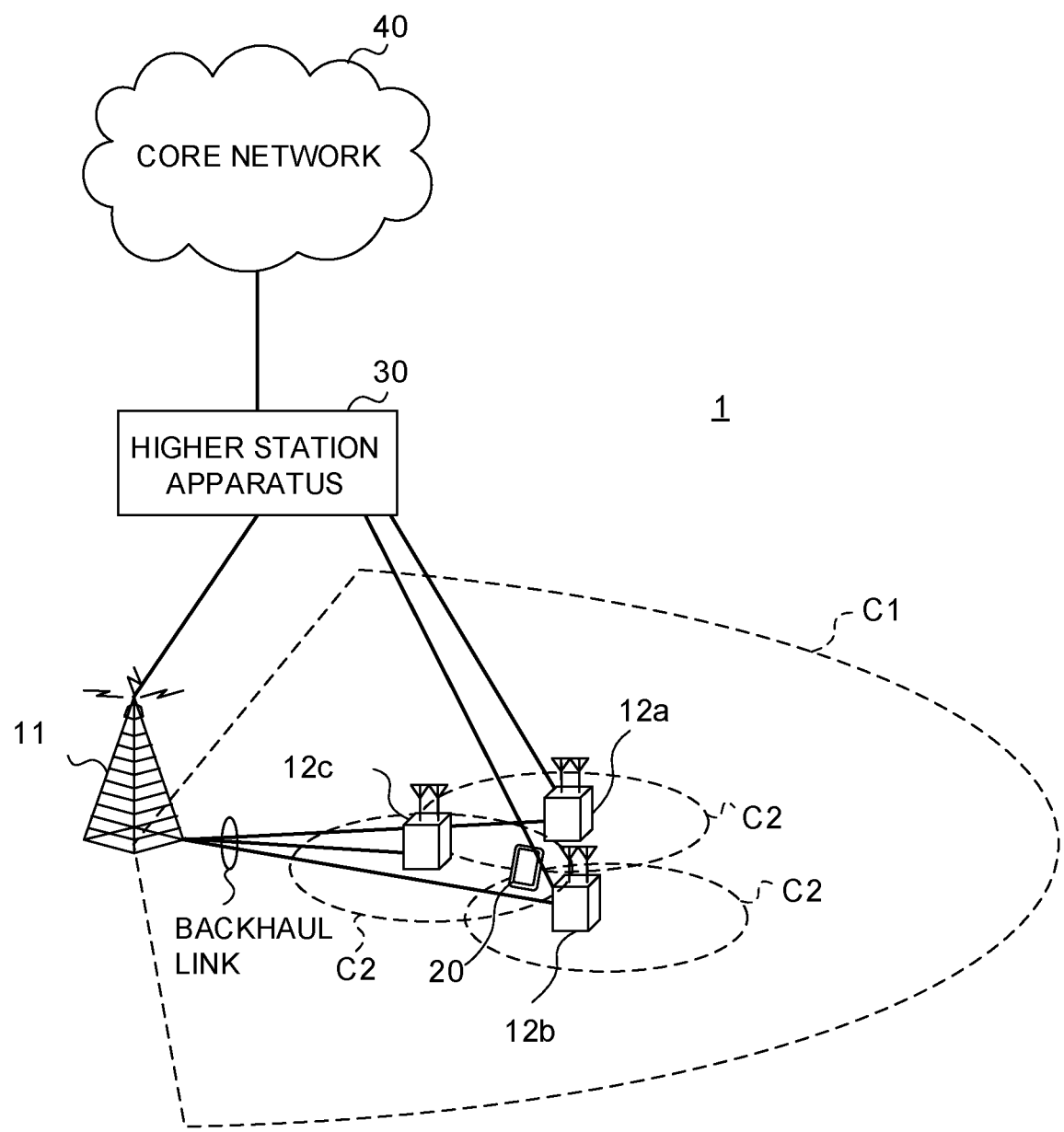
FIG. 6 is a diagram illustrating an example of a schematic configuration of a radio communication system according to the present embodiment.

FIG. 6 is a diagram illustrating an example of a schematic configuration of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)", "LTE-A (LTE-Advanced)", "LTE-B (LTE-Beyond)", "SUPER 3G", "IMT-Advanced", "4G (4th generation mobile communication system)", "5G (5th generation mobile communication system)", "NR (New Radio)", "FRA (Future Radio Access)", "New-RAT (Radio Access Technology)", and the like, or may be seen as a system to implement these.

The radio communication system 1 includes a base station 11 that forms a macro cell C1 covering a relatively wide coverage, and base stations 12 (12a to 12c) that are placed within the macro cell C1 and that form small cells C2, which are narrower than the macro cell C1. Also, user terminals 20 are placed in the macro cell C1 and in each small cell C2.

The arrangement, number, and the like of cells and user terminals 20 are not limited to an aspect shown in the drawings.

The user terminal 20 can connect with both the base station 11 and the base stations 12. It is assumed that the user terminals 20 use the macro cell C1 and the small cells C2 at the same time using CA or DC. Furthermore, the user terminals 20 may apply CA or DC using a plurality of cells (CCs).

Between the user terminal 20 and the base station 11, communication can be carried out using a carrier of a relatively low frequency band (for example, 2 GHz) and a narrow bandwidth (referred to as an "existing carrier", a "legacy carrier", and the like). Meanwhile, between the user terminal 20 and the base stations 12, a carrier of a relatively high frequency band (for example, 3.5 GHz, 5 GHz and the like) and a wide bandwidth may be used, or the same carrier as that used in the base station 11 may be used. Note that the structure of the frequency band for use in each base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or channel, and may indicate, for example, at least one of subcarrier spacing, bandwidth, symbol length, cyclic prefix length, subframe length, TTI length, number of symbols per TTI, radio frame configuration, specific filtering processing performed by a transceiver in a frequency domain, specific windowing processing performed by a transceiver in a time domain, and the like. For example, for a certain physical channel, when the subcarrier spacing differs and/or the numbers of OFDM symbols are different between the constituent OFDM symbols, this case may be described that they are different in numerology.

The base station 11 and the base station 12 (or between two base stations 12) may be connected by wire (for example, means in compliance with the common public radio interface (CPRI) such as optical fiber, an X2 interface, and the like) or wirelessly.

The base station 11 and the base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME), and the like, but is by no means limited to these. Also, each base station 12 may be connected with the higher station apparatus 30 via the base station 11.

Note that the base station 11 is a base station having a relatively wide coverage, and may be referred to as a "macro base station", an "aggregate node", an "eNB (eNodeB)", a "transmission/reception point", and the like. Also, the base stations 12 are base stations having local coverages, and may be referred to as "small base stations", "micro base stations", "pico base stations", "femto base stations", "HeNBs (Home eNodeBs)", "RRHs (Remote Radio Heads)", "transmission/reception points", and the like. Hereinafter the base stations 11 and 12 will be collectively referred to as "base stations 10", unless specified otherwise.

The user terminals 20 are terminals to support various communication schemes such as LTE, LTE-A, and the like, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication method of reducing an interference between terminals by dividing, for each of terminals, a system bandwidth into bands composed of one or continuous resource blocks, and causing a plurality of terminals to use mutually different bands. Note that the uplink and downlink radio access schemes are not limited to the combinations of these, and other radio access schemes can be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels, and the like are used as downlink channels. User data, higher layer control information, SIBs (System Information Blocks), and the like are communicated in the PDSCH. Further, MIB (Master Information Block) is transmitted by PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel), and the like. Downlink control information (DCI) including scheduling information of PDSCH and/or PUSCH, or the like is transmitted by PDCCH.

Note that DCI that schedules receipt of DL data may also be referred to as "DL assignment", and DCI that schedules transmission of UL data may also be referred to as "UL grant".

The number of OFDM symbols for use in PDCCH is transmitted by PCFICH. HARQ (Hybrid Automatic Repeat reQuest) delivery acknowledgement information (also referred to as, for example, "retransmission control information", "HARQ-ACKs", "ACK/NACKs", etc.) in response to the PUSCH is communicated by the PHICH. The EPDCCH is frequency-division-multiplexed with the PDSCH (downlink shared data channel) and used to communicate DCI and the like, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)), and the like are used as uplink channels. User data, higher layer control information, and the like are communicated by the PUSCH. Also, in the PUCCH, downlink radio quality information (CQI (Channel Quality Indicator)), delivery acknowledgement information, scheduling requests (SRs), and the like are communicated. By means of PRACH, random access preambles for establishing connections with cells are transmitted.

In the radio communication systems 1, cell-specific reference signal (CRSs), channel state information reference signal (CSI-RSs), demodulation reference signal (DMRSs), positioning reference signal (PRSs), and the like are communicated as downlink reference signals. Also, in the radio communication system 1, measurement reference signals (SRSs (Sounding Reference Signals)), demodulation reference signals (DMRSs), and the like are communicated as uplink reference signals. Note that, DMRSs may be referred to as "user terminal-specific reference signals (UE-specific Reference Signals)". Also, the reference signals to be communicated are by no means limited to these.

<Base Station>

Figure 7:
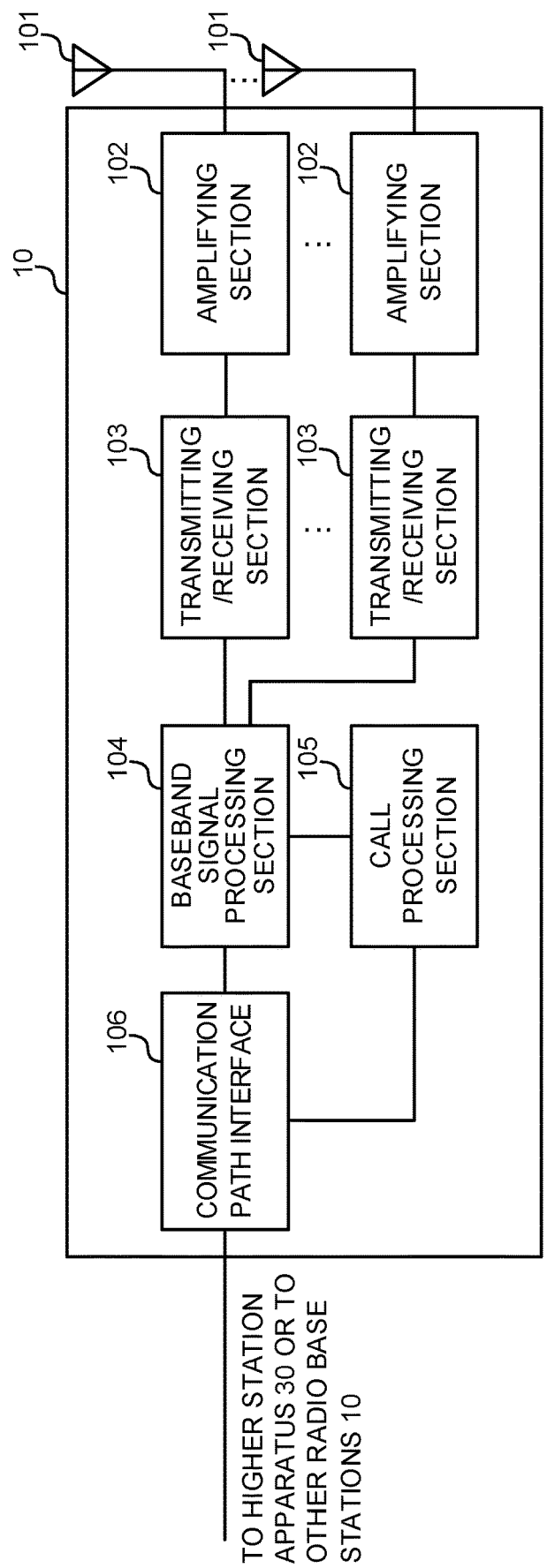
FIG. 7 is a diagram showing an example of an overall structure of a base station according to the present embodiment.

FIG. 7 is a diagram showing an example of an overall structure of a base station according to the present embodiment. A base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102, and transmitting/receiving sections 103 may be provided.

User data to be transmitted from the base station 10 to the user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Each of the transmitting/receiving sections 103 converts a baseband signal, which is pre-coded for each antenna and output from the baseband signal processing section 104, into a signal in a radio frequency band, and transmits such a radio frequency signal. A radio frequency signal subjected to the frequency conversion in each transmitting/receiving section 103 is amplified in the amplifying section 102, and transmitted from each transmitting/receiving antenna 101. The transmitting/receiving section 103 can be constituted by a transmitters/receiver, a transmitting/receiving circuit or transmitting/receiving apparatus that can be described based on general understanding of the technical field to which the present disclosure pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing) of communication channels, manages the state of the base stations 10 and manages the radio resources.

The communication path interface 106 transmits and receives signals to and from the higher station apparatus 30 via a predetermined interface. Also, the communication path interface 106 may transmit and receive signals (backhaul signaling) with other base stations 10 via an inter-base station interface (which is, for example, optical fiber that is in compliance with the CPRI (Common Public Radio Interface), the X2 interface).

Note that the transmitting/receiving section 103 may further include an analog beamforming section that performs analog beamforming. The analog beam forming section may be composed of an analog beam forming circuit (for example, a phase shifter, a phase shift circuit) or an analog beam forming device (for example, a phase shifter), which is described based on common understanding in the technical field according to the present invention. Further, the transmitting/receiving antenna 101 may be composed of an array antenna, for example.

The transmitting/receiving section 103 may transmit a downlink shared channel (for example, PDSCH) and a downlink control channel (for example, PDCCH) (downlink control information).

The transmitting/receiving section 103 may transmit information related to at least one TCI state of the downlink shared channel and the downlink control channel (for example, at least one of TCI state configuration information, information indicating the TCI state to be activated, information indicating the TCI state applied to PDCCH or PDSCH and the like).

Figure 8:
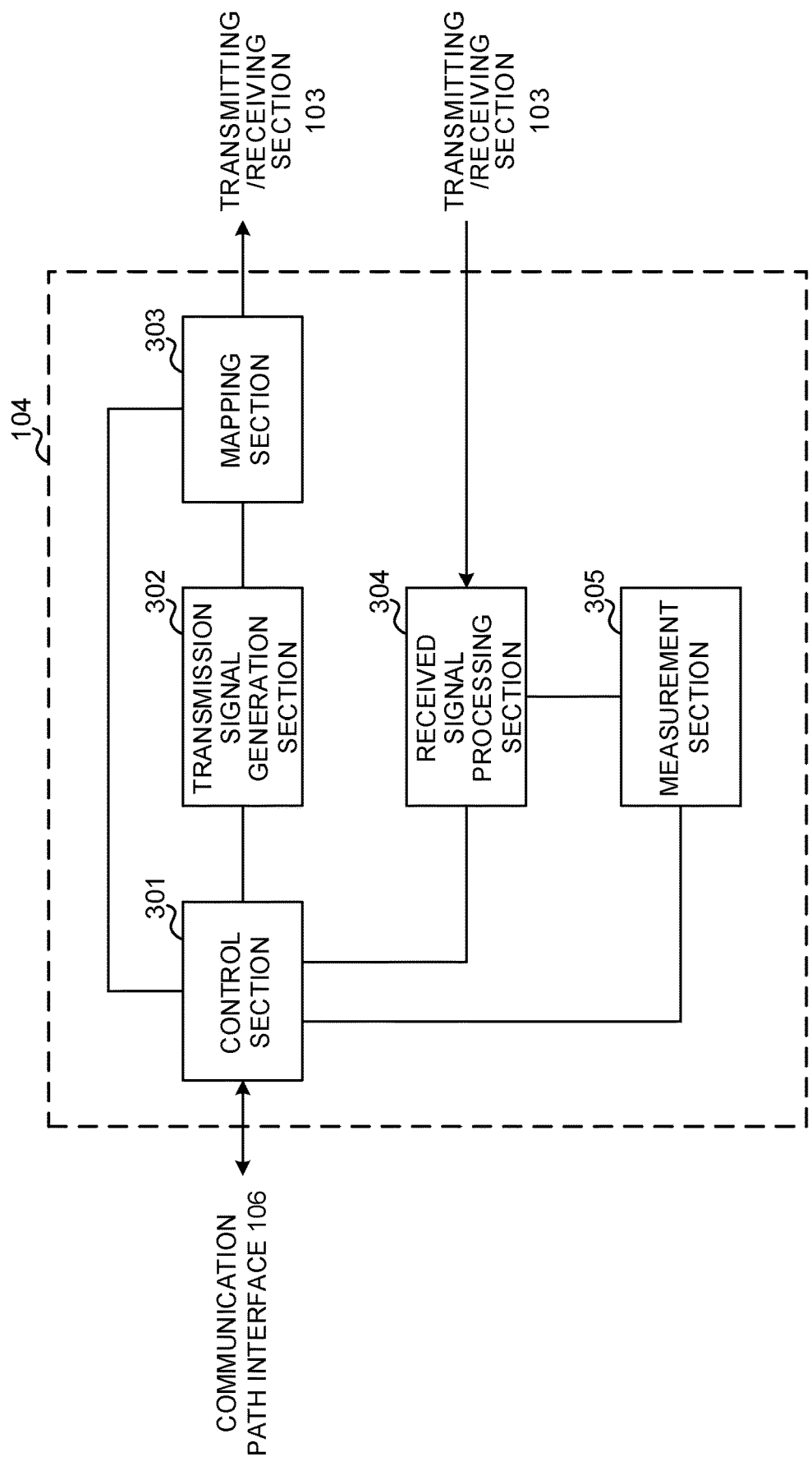
FIG. 8 is a diagram showing an example of a functional structure of the base station according to the present embodiment.

FIG. 8 is a diagram showing an example of a functional structure of the base station according to the present embodiment; Note that, although this example will primarily show functional blocks that pertain to characteristic parts of the present embodiment, it may be assumed that the base station 10 has other functional blocks that are necessary for radio communication as well.

The baseband signal processing section 104 at least has a control section (scheduler) 301, a transmission signal generation section 302, a mapping section 303, a received signal processing section 304, and a measurement section 305. Note that these configurations have only to be included in the base station 10, and some or all of these configurations may not be included in the baseband signal processing section 104.

The control section (scheduler) 301 controls the whole of the base station 10. The control section 301 can be constituted by a controller, a control circuit or control apparatus that can be described based on general understanding of the technical field to which the present disclosure pertains.

For example, the control section 301 controls the generation of signals in the transmission signal generation section 302, the allocation of signals in the mapping section 303, and the like. Furthermore, the control section 301 controls the signal receiving processing in the received signal processing section 304, the measurements of signals in the measurement section 305, and the like.

The control section 301 controls the scheduling (for example, resource allocation) of system information, downlink data signals (for example, signals transmitted in the PDSCH), and downlink control signals (for example, signals that are transmitted in the PDCCH and/or the EPDCCH, and delivery acknowledgement information). The control section 301 controls the generation of downlink control signals, downlink data signals and the like, based on the results of deciding whether or not retransmission control is necessary for uplink data signals, and the like.

Furthermore, the control section 301 controls the scheduling of synchronization signals (for example, the Primary Synchronization Signal (PSS)/Secondary Synchronization Signal (SSS)), SSB, downlink reference signals (for example, the CRS, the CSI-RS, and the DMRS), or the like.

The control section 301 controls the scheduling for uplink data signals (for example, signals transmitted in the PUSCH), uplink control signals (for example, signals that are transmitted in the PUCCH and/or the PUSCH, and delivery acknowledgement information), random access preambles (for example, signals transmitted in the PRACH), uplink reference signals, and the like.

The control section 301 may perform control to form a transmission beam and/or a reception beam using a digital BF (for example, precoding) in the baseband signal processing section 104 and/or an analog BF (for example, phase rotation) in the transmitting/receiving section 103. The control section 301 may perform control to form the beams based on downlink propagation path information, uplink propagation path information, and the like. These pieces of propagation path information may be acquired from the received signal processing section 304 and/or the measurement section 305.

The transmission signal generation section 302 generates downlink signals (downlink control signals, downlink data signals, downlink reference signals, and the like) based on commands from the control section 301, and outputs these signals to the mapping section 303. The transmission signal generation section 302 can be constituted by a signal generator, a signal generating circuit, or signal generation apparatus that can be described based on general understanding of the technical field to which the present disclosure pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process, and the like, by using coding rates and modulation schemes that are determined based on, for example, channel state information (CSI) reported from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present disclosure pertains.

The received signal processing section 304 performs receiving processes (for example, demapping, demodulation, decoding, and the like) of received signals that are input from the transmitting/receiving sections 103. Here, the received signals include, for example, uplink signals transmitted from the user terminals 20 (uplink control signals, uplink data signals, uplink reference signals, etc.). The received signal processing section 304 can be constituted by a signal processor, a signal processing circuit, or signal processing apparatus that can be described based on general understanding of the technical field to which the present disclosure pertains.

The received signal processing section 304 outputs, to the control section 301, information decoded by the receiving processing. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit, or measurement apparatus that can be described based on general understanding of the technical field to which the present disclosure pertains.

For example, the measurement section 305 may perform RRM (Radio Resource Management) measurements, CSI (Channel State Information) measurements, and the like, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), transmission path information (for example, CSI), and the like. The measurement results may be output to the control section 301.

<User Terminal>

Figure 9:
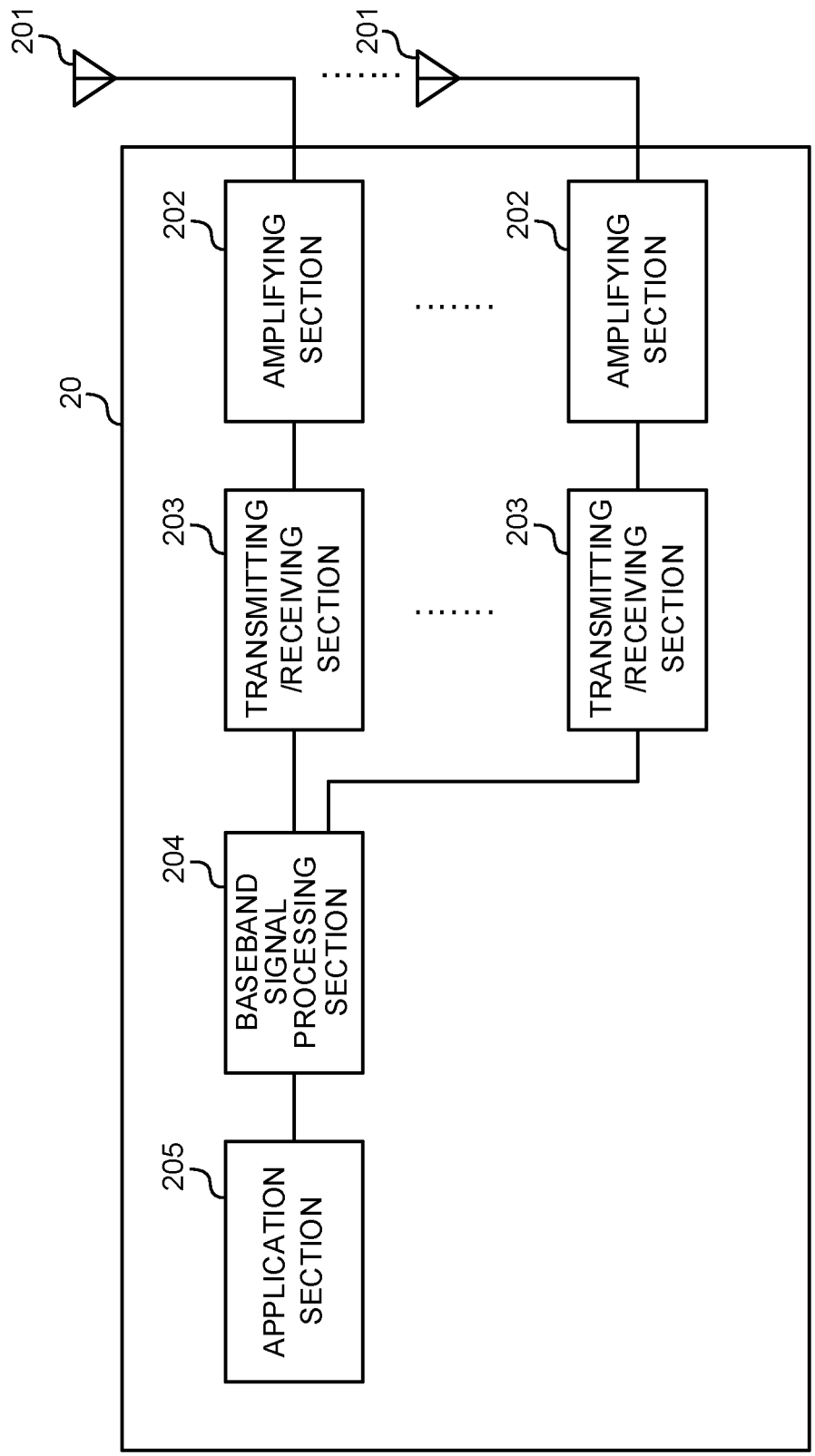
FIG. 9 is a diagram illustrating an example of an overall configuration of a user terminal according to the present embodiment.

FIG. 9 is a diagram illustrating an example of an overall structure of a user terminal according to the present embodiment. A user terminal 20 has a plurality of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving section 203 can be constituted by a transmitters/receiver, a transmitting/receiving circuit, or transmitting/receiving apparatus that can be described based on general understanding of the technical field to which the present disclosure pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process, and the like. Downlink user data is forwarded to the application section 205. The application section 205 performs processes related to higher layers above the physical layer and the MAC layer, and the like. Also, in the downlink data, the broadcast information can be also forwarded to the application section 205.

Meanwhile, uplink user data is input from the application section 205 to the baseband signal processing section 204.

The baseband signal processing section 204 performs a retransmission control transmission process (for example, an HARQ transmission process), channel coding, precoding, a discrete Fourier transform (DFT) process, an IFFT process, and the like, and the result is forwarded to the transmitting/receiving section 203.

Baseband signals that are output from the baseband signal processing section 204 are converted into a radio frequency band in the transmitting/receiving sections 203 and transmitted. The radio frequency signals having been subjected to frequency conversion in the transmitting/receiving sections 203 are amplified in the amplifying sections 202, and transmitted from the transmitting/receiving antennas 201.

Note that the transmitting/receiving section 203 may further include an analog beamforming section that performs analog beamforming. The analog beam forming section may be composed of an analog beam forming circuit (for example, a phase shifter, a phase shift circuit) or an analog beam forming device (for example, a phase shifter), which is described based on common understanding in the technical field according to the present invention. Further, the transmitting/receiving antenna 201 may be composed of an array antenna, for example.

The transmitting/receiving section 203 may receive a downlink shared channel (for example, PDSCH) and a downlink control channel (for example, PDCCH) (downlink control information).

The transmitting/receiving section 203 may receive information related to at least one TCI state of the downlink shared channel and the downlink control channel (for example, at least one of TCI state configuration information, information indicating the TCI state to be activated, information indicating the TCI state applied to PDCCH or PDSCH and the like).

Figure 10:
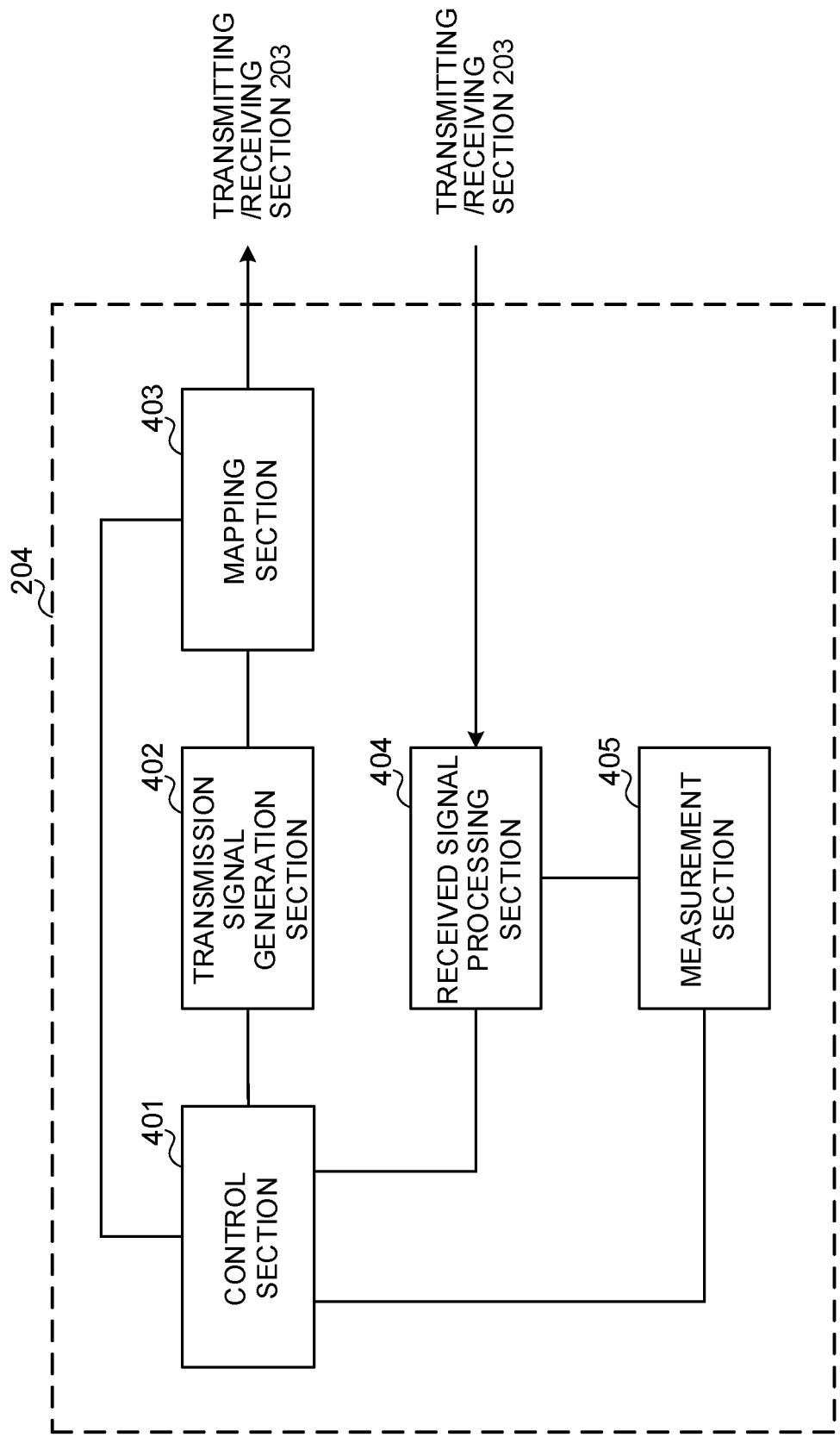
FIG. 10 is a diagram illustrating an example of a functional configuration of the user terminal according to the present embodiment.

FIG. 10 is a diagram illustrating an example of a functional configuration of the user terminal according to the present embodiment. Note that, although this example will primarily show functional blocks that pertain to characteristic parts of the present embodiment, it may be assumed that the user terminal 20 have other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations may be included in the user terminal 20, and some or all of the configurations need not be included in the baseband signal processing section 204.

The control section 401 controls the whole of the user terminal 20. The control section 401 can be constituted by a controller, a control circuit, or control apparatus that can be described based on general understanding of the technical field to which the present disclosure pertains.

The control section 401, for example, controls the generation of signals in the transmission signal generation section 402, the allocation of signals in the mapping section 403, and the like. Furthermore, the control section 401 controls the signal receiving processing in the received signal processing section 404, the measurements of signals in the measurement section 405, and the like.

The control section 401 acquires the downlink control signals and downlink data signals transmitted from the base station 10, via the received signal processing section 404. The control section 401 controls the generation of uplink control signals and/or uplink data signals based on the results of deciding whether or not retransmission control is necessary for the downlink control signals and/or downlink data signals, and the like.

The control section 401 may perform control to form a transmission beam and/or a reception beam using a digital BF (for example, precoding) in the baseband signal processing section 204 and/or an analog BF (for example, phase rotation) in the transmitting/receiving section 203. The control section 401 may perform control to form the beams based on downlink propagation path information, uplink propagation path information, and the like. These pieces of propagation path information may be acquired from the received signal processing section 404 and/or the measurement section 405.

Further, when the control section 401 acquires various information reported from the base station 10 from the received signal processing section 404, the control section 401 may update the parameter used for control based on the information.

When the SSB and a given reference signal are configured in the same time resource, the control section 401 controls the receiving of the SSB and the given reference signal on the basis of the QCL relationship between the SSB and the given reference signal and the subcarrier spacing. When the QCL relationship and the subcarrier spacing of the SSB and the given reference signal are the same, the control section 401 performs control to receive both the SSB and the given reference signal. When at least one of the QCL relationship and the subcarrier spacing of the SSB and the given reference signal is different, the control section 401 performs control to receive one of the SSB and the given reference signal. The control section 401 performs control to select and receive one of the SSB and the given reference signal on the basis of the use of the SSB and the use of the given reference signal.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit, or signal generation apparatus that can be described based on general understanding of the technical field to which the present disclosure pertains.

For example, the transmission signal generation section 402 generates uplink control signals such as delivery acknowledgement information, channel state information (CSI), and the like, based on commands from the control section 401. Also, the transmission signal generation section 402 generates uplink data signals based on commands from the control section 401. For example, when a UL grant is included in a downlink control signal that is reported from the base station 10, the control section 401 instructs the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit, or mapping apparatus that can be described based on general understanding of the technical field to which the present disclosure pertains.

The received signal processing section 404 performs receiving processes (for example, demapping, demodulation, decoding, and the like) of received signals that are input from the transmitting/receiving sections 203. Here, the received signals include, for example, downlink signals (downlink control signals, downlink data signals, downlink reference signals, and the like) that are transmitted from the base station 10. The received signal processing section 404 can be constituted by a signal processor, a signal processing circuit, or signal processing apparatus that can be described based on general understanding of the technical field to which the present disclosure pertains. Also, the received signal processing section 404 can constitute the receiving section according to the present disclosure.

The received signal processing section 404 outputs the decoded information that is acquired through the receiving processing to the control section 401. The received signal processing section 404 outputs, for example, broadcast information, system information, RRC signaling, DCI, and the like, to the control section 401. Also, the received signal processing section 404 outputs the received signals and/or the signals after the receiving processes to the measurement section 405.

The measurement section 405 conducts measurements with respect to the received signals. For example, the measurement section 405 may perform same frequency measurement and/or different frequency measurement for one or both of the first carrier and the second carrier. When the serving cell is included in the first carrier, the measurement section 405 may perform the different frequency measurement in the second carrier based on a measurement instruction acquired from the received signal processing section 404. The measurement section 405 can be constituted by a measurer, a measurement circuit, or measurement apparatus that can be described based on general understanding of the technical field to which the present disclosure pertains.

For example, the measurement section 405 may perform RRM measurements, CSI measurements, and the like based on the received signals. The measurement section 405 may measure the received power (for example, RSRP), the received quality (for example, RSRQ, SINR, SNR, etc.), the signal strength (for example, RSSI), transmission path information (for example, CSI), and the like. The measurement results may be output to the control section 401.

<Hardware Configuration>

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses.

Figure 11:
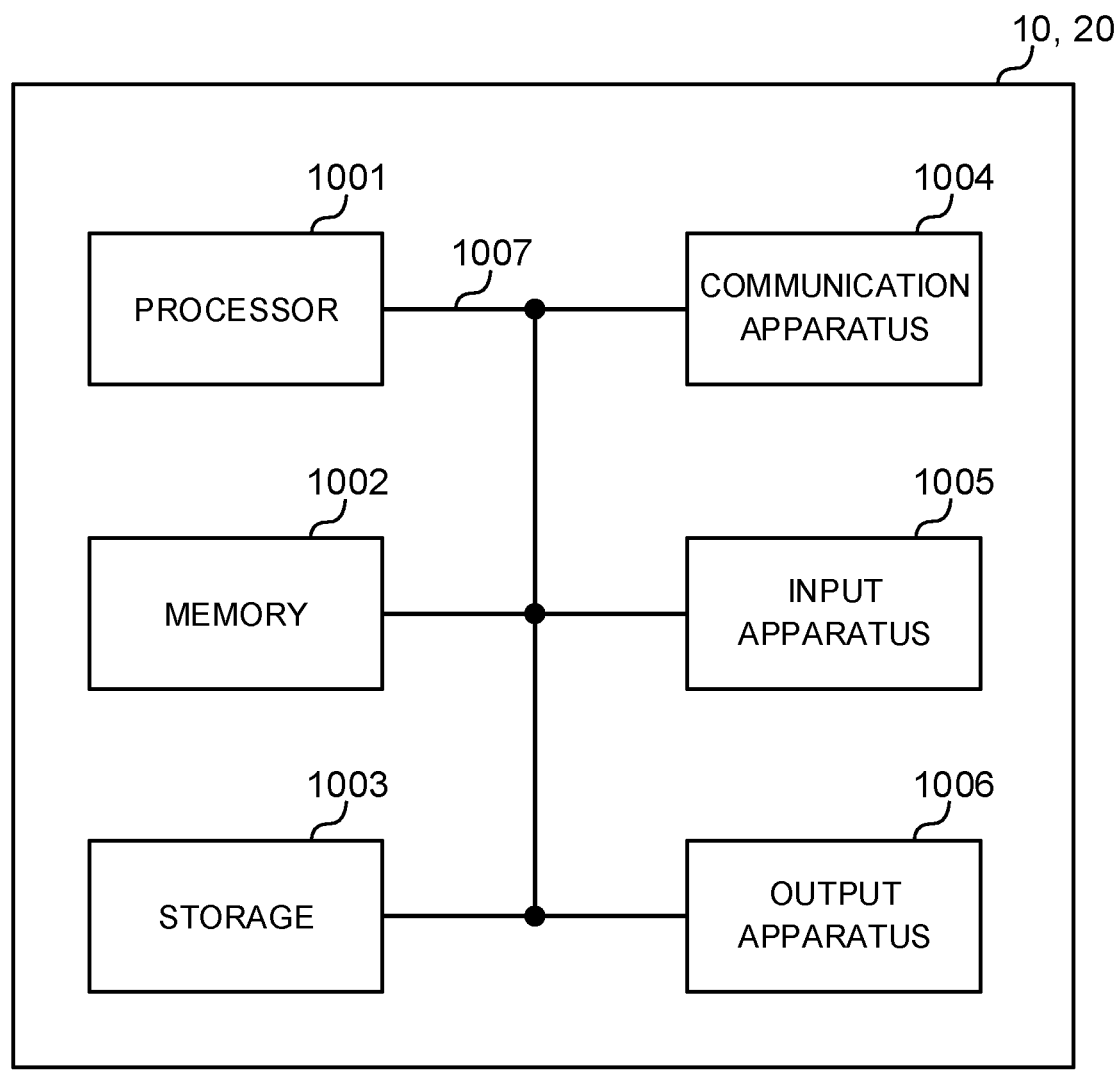
FIG. 11 is a diagram showing an example of a hardware structure of the base station and the user terminal according to the present embodiment.

For example, the radio base station, user terminals, and the like according to the present embodiment of the present disclosure may function as a computer that executes the processes of the communication method of the present disclosure. FIG. 11 is a diagram showing an example of a hardware structure of the base station and the user terminal according to the present embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, and a bus 1007.

Note that, in the following description, the word "apparatus" may be replaced by "circuit", "device", "unit", and the like. The hardware structure of the base station 10 and the user terminal 20 may be designed to include one or more of each apparatus shown in the drawings, or may be designed not to include some apparatuses.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the base station 10 and the user terminal 20 is implemented by reading predetermined software (program) on hardware such as the processor 1001 and the memory 1002, and by controlling the operation in the processor 1001, the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with a peripheral equipment, a control apparatus, a computing apparatus, a register, and the like. For example, the above-described baseband signal processing section 104 (204), call processing section 105, and the like may be implemented by the processor 1001.

Furthermore, the processor 1001 reads programs (program codes), software modules, or data, from at least one of the storage 1003 and the communication apparatus 1004, into the memory 1002, and executes various processing according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and/or other appropriate storage media. The memory 1002 may be referred to as a "register", a "cache", a "main memory (primary storage apparatus)", and the like. The memory 1002 can store executable programs (program codes), software modules, and the like for implementing the radio communication method according to the present embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and the like), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be configured to include a high frequency switch, a duplexer, a filter, a frequency synthesizer, and the like in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and the like may be implemented by the communication apparatus 1004.

The input apparatus 1005 is an input device for receiving input from the outside (for example, a keyboard, a mouse, a microphone, a switch, a button, a sensor, and the like). The output apparatus 1006 is an output device for allowing sending output to the outside (for example, a display, a speaker, an LED (Light Emitting Diode) lamp, and the like). Note that the input apparatus 1005 and the output apparatus 1006 may be provided in an integrated structure (for example, a touch panel).

Furthermore, these pieces of apparatus, including the processor 1001, the memory 1002, and the like are connected by the bus 1007 so as to communicate information. The bus 1007 may be formed with a single bus, or may be formed with buses that vary between pieces of apparatus.

Also, the base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array), and the like, and part or all of the functional blocks may be implemented by the hardware. For example, the processor 1001 may be implemented with at least one of these pieces of hardware.

(Variations)

Note that the terminology used in the present disclosure and the terminology that is needed to understand the present disclosure may be replaced by other terms that convey the same or similar meanings. For example, "channels" and "symbols" may be replaced by "signals" (or "signaling"). Also, "signals" may be replaced by "messages". A reference signal may be abbreviated as an "RS", and may be referred to as a "pilot", a "pilot signal" and the like, depending on which standard applies. Furthermore, a "component carrier (CC)" may be referred to as a "cell", a "frequency carrier", a "carrier frequency", and the like.

A radio frame may be comprised of one or more periods (frames) in the time domain. Each of one or more periods (frames) constituting a radio frame may be referred to as a "subframe". Furthermore, a subframe may be comprised of one or multiple slots in the time domain. A subframe may be a fixed time duration (for example, 1 ms) that is not dependent on numerology.

Here, the numerology may be a communication parameter used for at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain, and the like.

A slot may be comprised of one or more symbols in the time domain (OFDM (Orthogonal Frequency Division Multiplexing) symbols, SC-FDMA (Single Carrier Frequency Division Multiple Access) symbols, and the like). Also, a slot may be a time unit based on numerology.

A slot may include a plurality of mini slots. Each mini slot may be comprised of one or more symbols in the time domain. Also, a mini slot may be referred to as a "subslot". Each mini slot may be comprised of fewer symbols than a slot. A PDSCH (or PUSCH) transmitted in a time unit larger than a mini slot may be referred to as PDSCH (PUSCH) mapping type A. A PDSCH (or PUSCH) transmitted using a mini slot may be referred to as "PDSCH (PUSCH) mapping type B".

A radio frame, a subframe, a slot, a mini slot, and a symbol all represent the time unit in signal communication. A radio frame, a subframe, a slot, a mini slot, and a symbol may be each called by other applicable names. Note that time units such as a frame, a subframe, a slot, a mini slot, and a symbol in the present disclosure may be replaced with each other.

For example, one subframe may be referred to as a "transmission time interval (TTI)", or a plurality of consecutive subframes may be referred to as a "TTI", or one slot or one mini slot may be referred to as a "TTI". That is, at least one of a subframe and a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot", a "mini slot", and the like, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks, codewords and the like, or may be the unit of processing in scheduling, link adaptation, and the like. Note that when TTI is given, a time interval (for example, the number of symbols) in which the transport blocks, the code blocks, the codewords, and the like are actually mapped may be shorter than TTI.

Note that, when one slot or one mini slot is referred to as a "TTI", one or more TTIs (that is, one or multiple slots or one or more mini slots) may be the minimum time unit of scheduling. Also, the number of slots (the number of mini slots) to constitute this minimum time unit of scheduling may be controlled.

TTI having a time length of 1 ms may be called usual TTI (TTI in LTE Rel. 8 to 12), normal TTI, long TTI, a usual subframe, a normal subframe, a long subframe, a slot, or the like. A TTI that is shorter than a usual TTI may be referred to as "shortened TTI", "short TTI", "partial TTI" (or "fractional TTI"), "shortened subframe", "short subframe", "mini slot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be 12, for example. The number of subcarriers included in the RB may be determined based on numerology.

Also, an RB may include one or more symbols in the time domain, and may be one slot, one mini slot, one subframe, or one TTI in length. One TTI, one subframe, and the like each may be comprised of one or more resource blocks.

Note that one or more RBs may be referred to as a "physical resource block (PRB (Physical RB))", a "subcarrier group (SCG)", a "resource element group (REG)", a "PRB pair", an "RB pair", and the like.

Furthermore, a resource block may be comprised of one or more resource elements (REs). For example, one RE may be a radio resource field of one subcarrier and one symbol.

The bandwidth part (BWP) (which may be called partial bandwidth etc.) may represent a subset of consecutive common RB (common resource blocks) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a predetermined channel/signal outside the active BWP. Note that "cell", "carrier", and the like in the present disclosure may be read as "BWP".

Note that the structures of radio frames, subframes, slots, mini slots, symbols, and the like described above are merely examples. For example, configurations pertaining to the number of subframes included in a radio frame, the number of slots included in a subframe, the number of mini-slots included in a slot, the number of symbols and RBs included in a slot or a mini slot, the number of subcarriers included in an RB, the number of symbols in a TTI, the symbol duration, the length of cyclic prefixes (CPs), and the like can be variously changed.

Also, the information and parameters described in the present disclosure may be represented in absolute values or in relative values with respect to predetermined values, or may be represented using other applicable information. For example, a radio resource may be specified by a predetermined index.

The names used for parameters and the like in the present disclosure are in no respect limiting. In addition, an equation and the like using these parameters may differ from those explicitly disclosed in the present disclosure. Since various channels (PUCCH (Physical Uplink Control Channel), PDCCH (Physical Downlink Control Channel) and the like) and information elements can be identified by any suitable names, the various names assigned to these individual channels and information elements are in no respect limiting.

The information, signals, and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals and the like can be output in at least one of a direction from higher layers to lower layers and a direction from lower layers to higher layers. Information, signals, and the like may be input and output via a plurality of network nodes.

The information, signals, and the like that are input and/or output may be stored in a specific location (for example, in a memory), or may be managed in a control table. The information, signals, and the like to be input and/or output can be overwritten, updated or appended. The information, signals, and the like that are output may be deleted. The information, signals, and the like that are input may be transmitted to other pieces of apparatus.

The reporting of information is by no means limited to the aspects/embodiments described in the present disclosure, and may be performed using other methods. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs), and the like), MAC (Medium Access Control) signaling), other signals, or combinations of these.

Note that physical layer signaling may be referred to as "L1/L2 (Layer 1/Layer 2) control information (L1/L2 control signals)", "L1 control information (L1 control signal)", and the like. Also, RRC signaling may be referred to as "RRC messages", and can be, for example, an RRC connection setup (RRCConnectionSetup) message, RRC connection reconfiguration (RRCConnectionReconfiguration) message, and the like. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and the like).

Decisions may be made in values represented by one bit (0 or 1), may be made in Boolean values that represent true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and the like.

Also, software, commands, information, and the like may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "precoding", "precoder", "weight (precoding weight)", "transmission power", "phase rotation", "antenna port", "layer", "layer number", "rank", "beam", "beam width", "beam angle", "antenna", "antenna element", and "panel" can be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" may be used interchangeably. The base station may be called a term such as a macro cell, a small cell, a femto cell, a pico cell, and the like.

A base station can accommodate one or more (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station and a base station subsystem that provides communication services within this coverage.

In the present disclosure, the terms "mobile station (MS)", "user terminal", "user equipment (UE)", "terminal", and the like may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be referred to as transmitting apparatus, receiving apparatus, and the like. Note that at least one of the base station and the mobile station may be a device mounted on a mobile unit, a mobile unit itself, or the like. The moving body may be a transportation (for example, a car, an airplane and the like), an unmanned moving body (for example, a drone, an autonomous car and the like), or a (manned or unmanned) robot. Note that at least one of the base station and the mobile station also includes a device that does not necessarily move during a communication operation.

Furthermore, the base stations in the present disclosure may be read as the user terminal. For example, each aspect/embodiment of the present disclosure may be applied to a structure in which communication between the base station and the user terminal is replaced by communication among a plurality of user terminal (which may be referred to as, for example, D2D (Device-to-Device), V2X (Vehicle-to-Everything), and the like). In this case, the user terminal 20 may have the functions of the base station 10 described above. In addition, the wording such as "up" and "down" may be replaced with the wording corresponding to the terminal-to-terminal communication (for example, "side"). For example, an uplink channel, and a downlink channel may be interpreted as a side channel.

Likewise, the user terminal in the present disclosure may be interpreted as the base station. In this case, the base station 10 may have the functions of the user terminal 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and the like may be possible, but these are not limiting) other than base stations, or combinations of these.

The aspects/embodiments shown in the present disclosure may be used individually or in combinations, which may be switched depending on the mode of implementation. The order of processes, sequences, flowcharts, and the like that have been used to describe the aspects/embodiments in the present disclosure may be re-ordered as long as inconsistencies do not arise. For example, although various methods have been shown in the present disclosure with various components of steps using exemplary orders, the specific orders that are shown herein are by no means limiting.

The aspects/embodiments shown in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second", and the like as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The terms "judge" and "determine" as used in the present disclosure may encompass a wide variety of actions. For example, "determining" may be regarded as "determining" judging, calculating, computing, processing, deriving, investigating, looking up (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and the like.

In addition, to "judge" and "determine" as used herein may be interpreted to mean making judgements and determinations related to resolving, selecting, choosing, establishing, comparing, and the like. In other words, to "judge" and "determine" as used herein may be interpreted to mean making judgements and determinations related to some action.

In addition, to "judge" and "determine" as used herein may be interpreted to mean "assuming", "expecting", "considering", and the like.

The term "maximum transmit power" described in the present disclosure may mean the maximum value of transmit power, the nominal UE maximum transmit power, or the rated UE maximum transmit power.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced by "access".

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other". Note that the term may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive disjunction.

In the present disclosure, where translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a processor that controls reception of a synchronization signal block (SSB) and a channel state information reference signal (CSI-RS) that are able to be allocated to a same time resource, based on:
  (1) at least one of a quasi-colocation (QCL) relationship of the SSB and the CSI-RS, and subcarrier spacing of the SSB and subcarrier spacing of the CSI-RS, and
  (2) a frequency range; and
a receiver that receives at least one of the SSB and the CSI-RS,
wherein when the SSB and the CSI-RS are in separate cells subjected to carrier aggregation and the SSB and the CSI-RS are not of a specific QCL type, the processor further controls to receive either of the SSB and the CSI-RS based on use of the SSB and use of the CSI-RS.

2. The terminal according to claim 1, wherein when the subcarrier spacing of the SSB and the subcarrier spacing of the CSI-RS are same and the frequency range is a first frequency range, the processor controls to perform reception of both of the SSB and of the CSI-RS.

3. The terminal according to claim 1, wherein when the SSB and the CSI-RS are of a specific QCL type, the processor controls to perform reception of both of the SSB and of the CSI-RS.

4. The terminal according to claim 1, wherein when the subcarrier spacing of the SSB and the subcarrier spacing of the CSI-RS are different, the frequency range is a first frequency range and simultaneous receiving capability is supported, the processor controls to receive both of the SSB and the CSI-RS and when the simultaneous receiving capability is not supported, the processor controls to receive either of the SSB and the CSI-RS.

5. The terminal according to claim 1, wherein the processor further controls to receive either of the SSB and the CSI-RS based on use of the SSB and use of the CSI-RS.

6. The terminal according to claim 1, wherein the processor further controls reception of at least one of the SSB and the CSI-RS based on different frequency ranges applied to the SSB and the CSI-RS.

7. The terminal according to claim 1, wherein the processor controls to receive the CSI-RS that is configured outside of a measurement window of the SSB.

8. A radio communication method for a terminal, comprising:
controlling reception of a synchronization signal block (SSB) and a channel state information reference signal (CSI-RS) that are able to be allocated to a same time resource, based on:
  (1) at least one of a quasi-colocation (QCL) relationship of the SSB and the CSI-RS, and subcarrier spacing of the SSB and subcarrier spacing of the CSI-RS, and
  (2) a frequency range; and
receiving at least one of the SSB and the CSI-RS,
wherein when the SSB and the CSI-RS are in separate cells subjected to carrier aggregation and the SSB and the CSI-RS are not of a specific QCL type, the terminal further controls to receive either of the SSB and the CSI-RS based on use of the SSB and use of the CSI-RS.

9. A system comprising: a base station and a terminal, wherein
the base station comprises:
  a transmitter that transmits to the terminal a synchronization signal block (SSB) and a channel state information reference signal (CSI-RS) that are able to be allocated to a same time resource, and
the terminal comprises:
  a processor that controls reception of the SSB and the CSI-RS that are able to be allocated to the same time resource, based on:
    (1) at least one of a quasi-colocation (QCL) relationship of the SSB and the CSI-RS, and subcarrier spacing of the SSB and subcarrier spacing of the CSI-RS, and
    (2) a frequency range; and
  a receiver that receives at least one of the SSB and the CSI-RS,
  wherein when the SSB and the CSI-RS are in separate cells subjected to carrier aggregation and the SSB and the CSI-RS are not of a specific QCL type, the processor further controls to receive either of the SSB and the CSI-RS based on use of the SSB and use of the CSI-RS.

* * * * *